Jan. 2, 1934.   T. N. PIERSON   1,942,037
HARVESTING MACHINE
Filed Oct. 27, 1932   5 Sheets-Sheet 5
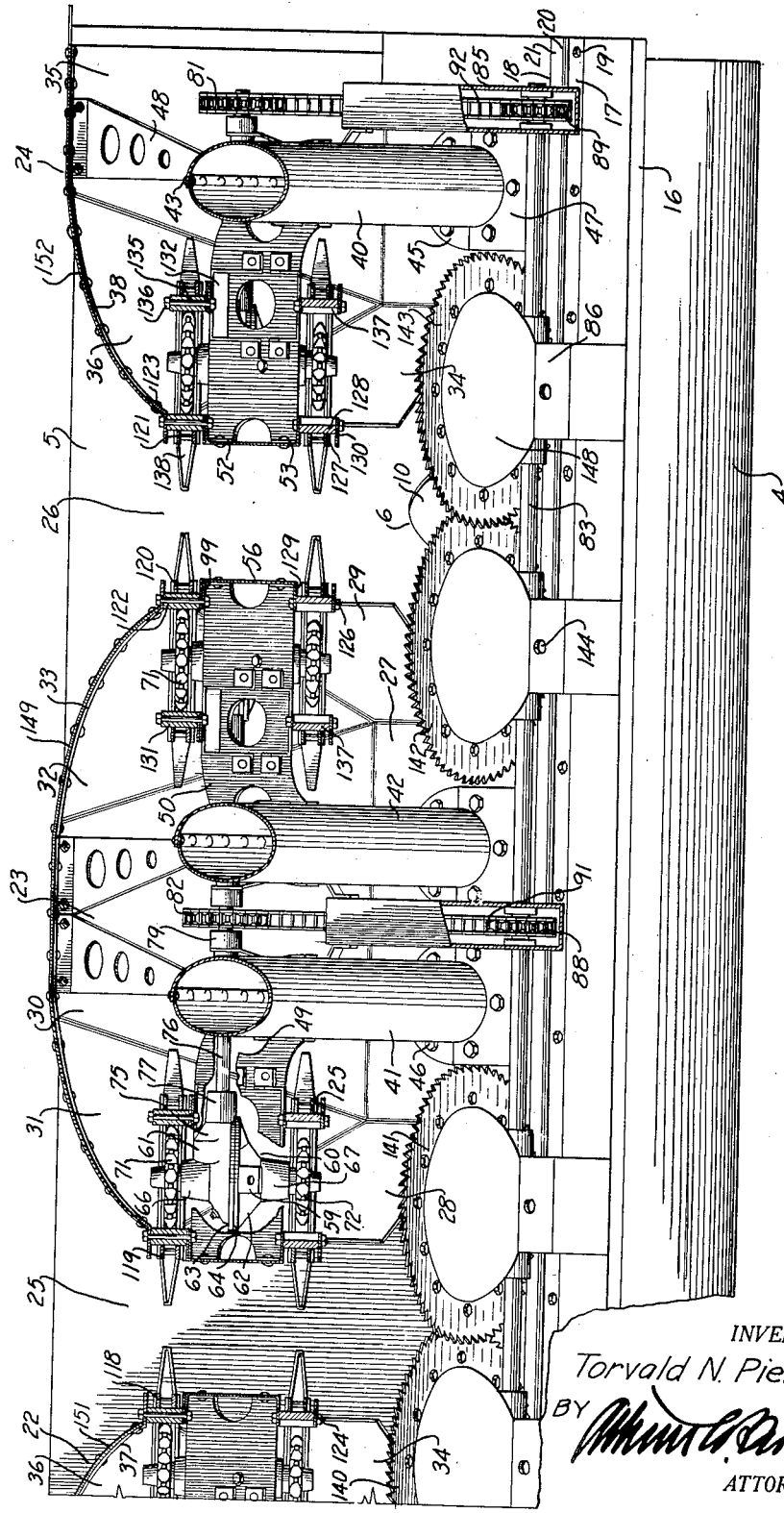
INVENTOR.
Torvald N. Pierson.
BY
ATTORNEY.

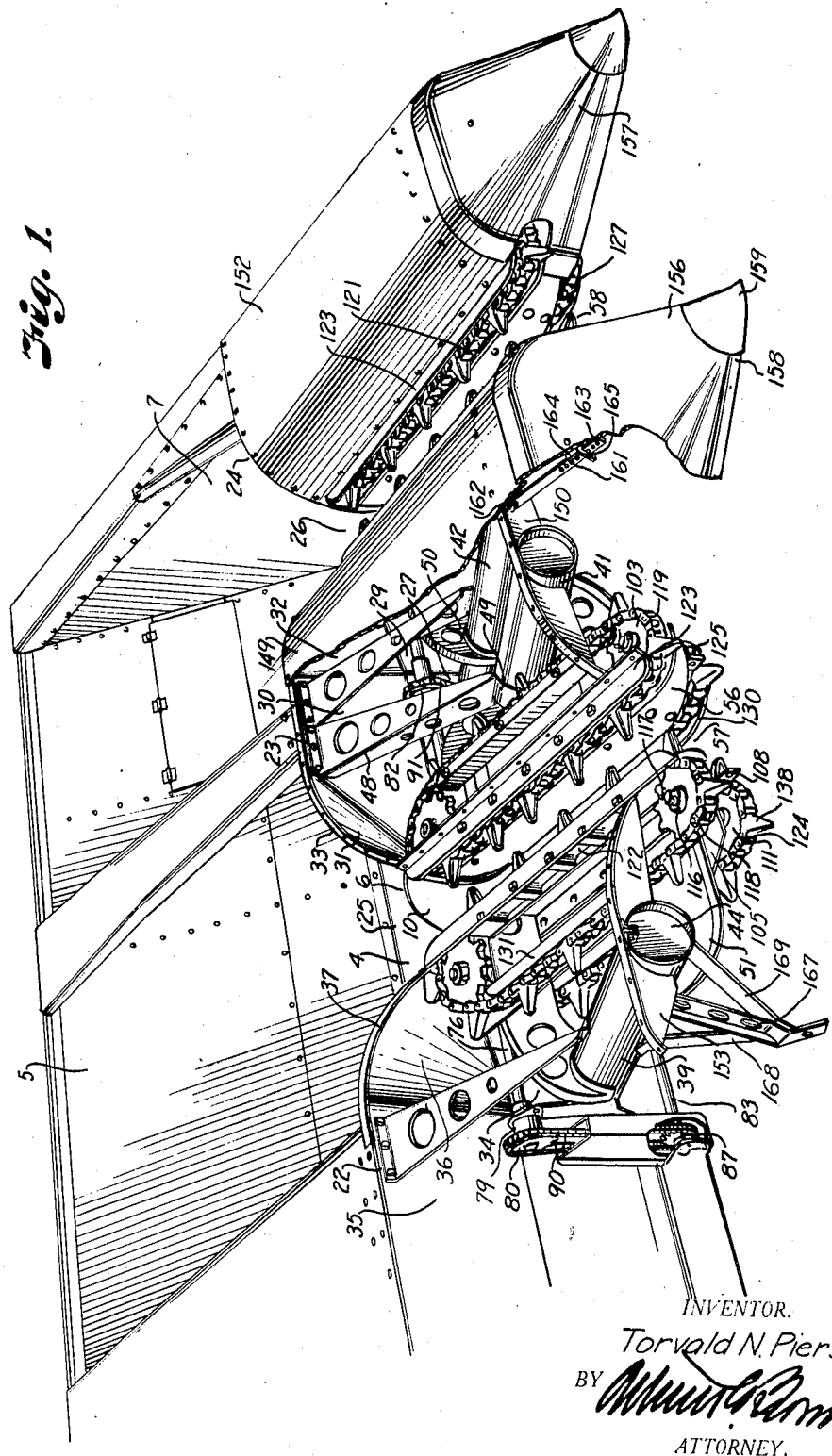

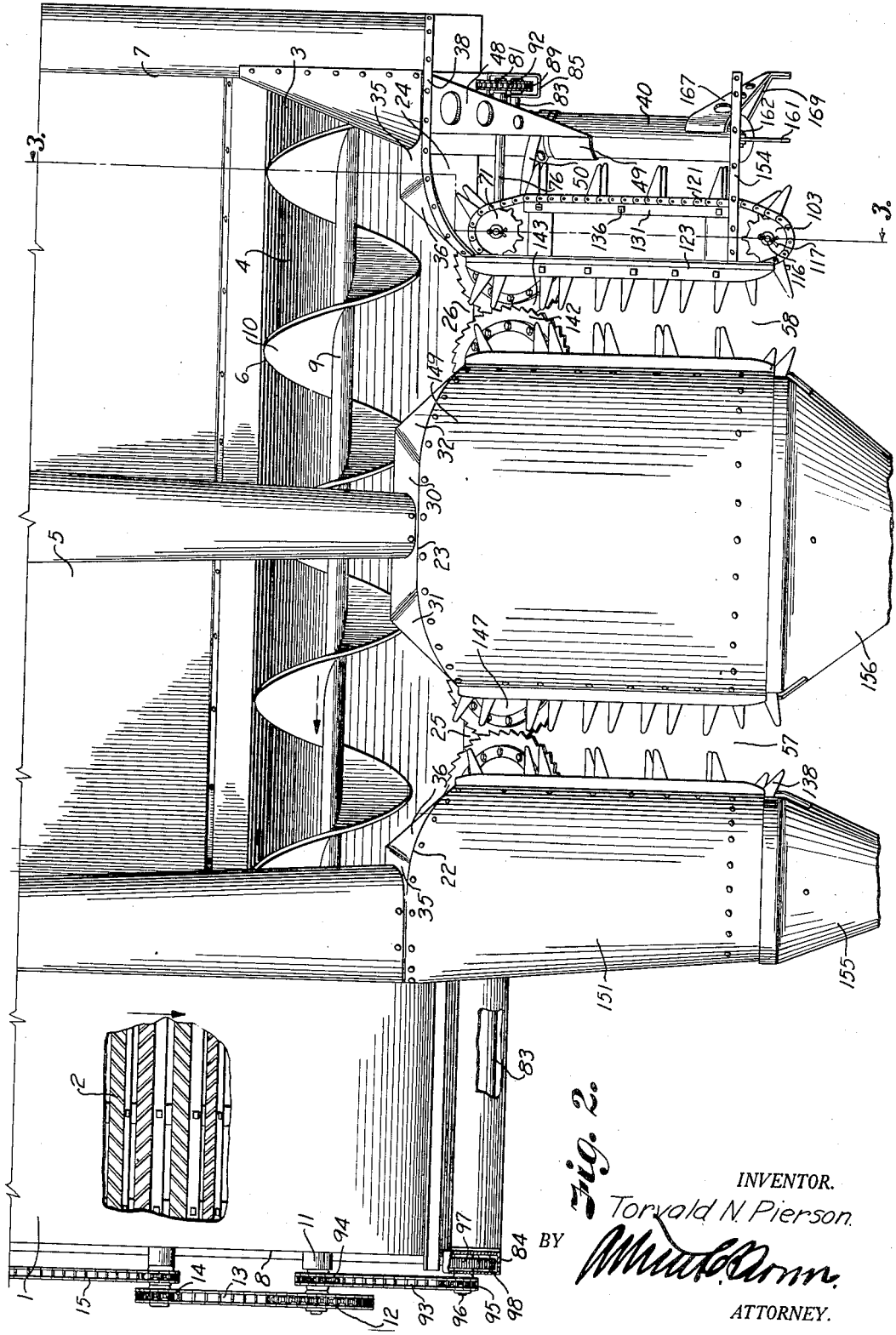

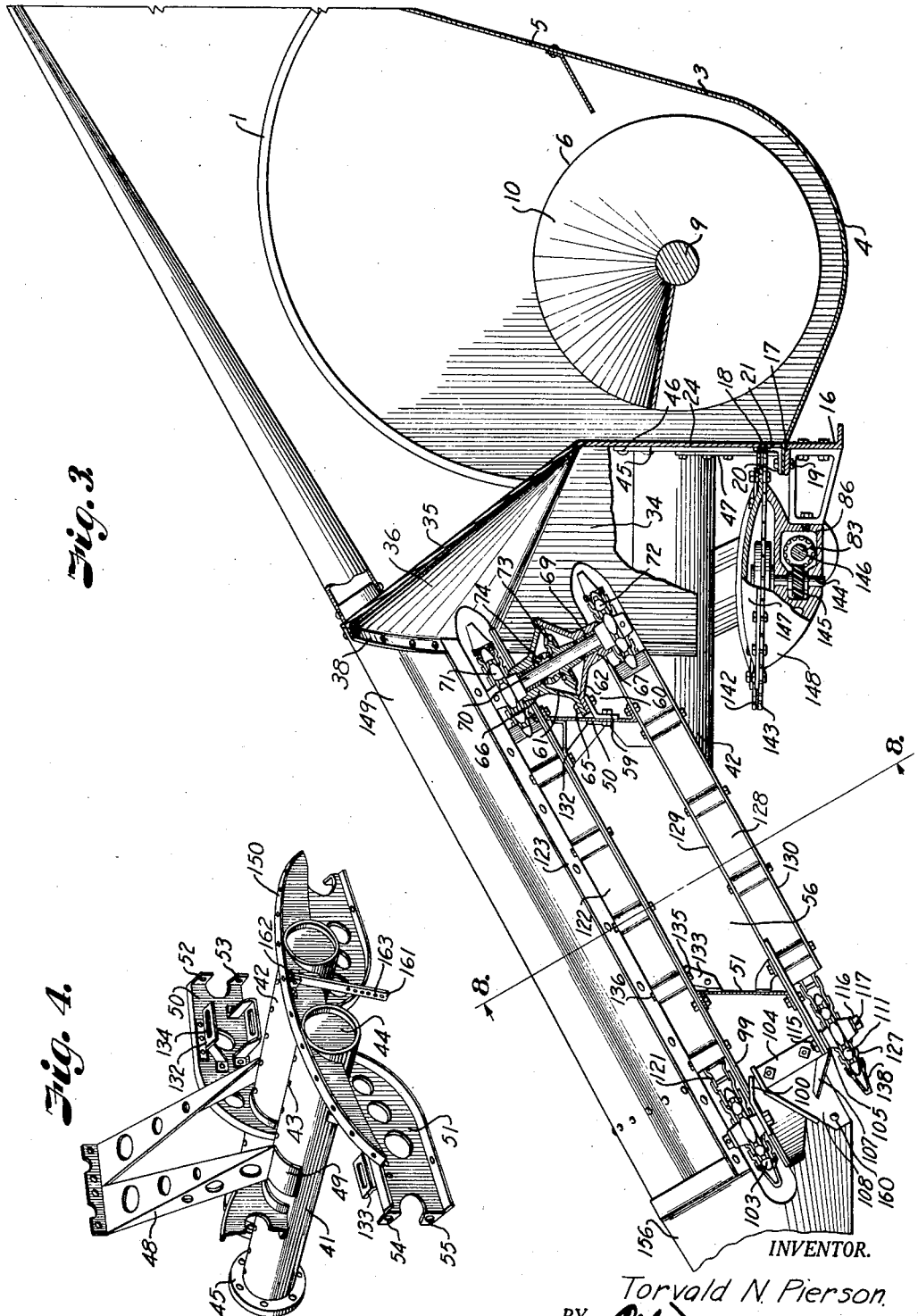

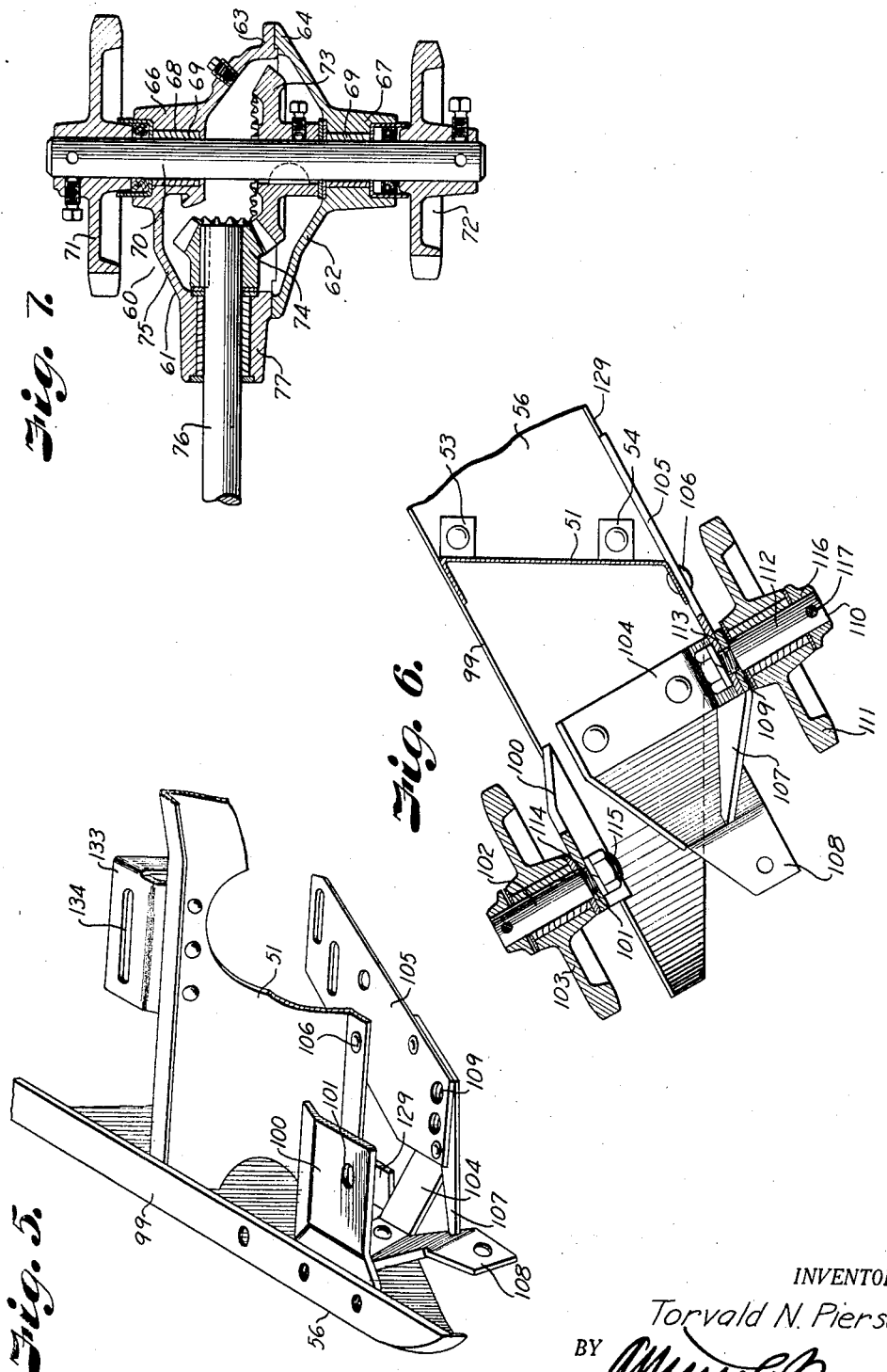

Patented Jan. 2, 1934

1,942,037

UNITED STATES PATENT OFFICE 1,942,037

HARVESTING MACHINE

Torvald N. Pierson, Independence, Mo., assignor to Gleaner Harvester Corporation, Independence, Mo., a corporation of Delaware Application October 27, 1932. Serial No. 639,828

21 Claims. (Cl. 56—15)

This invention relates to harvesting machines and more particularly to one for harvesting maize crops such as corn and the like, and has for its principal object to provide a stronger and more rigid construction per unit of weight and which is capable of resisting the stresses and strains incidental to harvesting relatively heavy crops such as corn.

Another important object of the invention is to provide a simple and efficient pick-up mechanism for straightening and diverting reclining stalks of corn for positive delivery into the machine.

In accomplishing these and other objects of the invention, I have provided improved details of structure, the preferred form of which is illustrated in the accompanying drawings, wherein:

Fig. 1 is a perspective view of the harvesting unit of the machine, with the left hand guard cover removed and a portion of the center guard broken away to better illustrate the pick-up mechanisms and their supporting structures.

Fig. 2 is a plan view of the unit showing its connection with the shredding and shelling unit of the machine.

Fig. 3 is a cross sectional view through one of the pick-up mechanisms on the line 3—3, Fig. 2.

Fig. 4 is a detail perspective view of the central supporting structure for the pick-up mechanism.

Fig. 5 is an enlarged detail perspective view of the end of one of the brackets for carrying the pick-up chain sprockets.

Fig. 6 is a vertical sectional view through the forward pick-up sprockets.

Fig. 7 is a vertical sectional view through the sprockets carrying the rear ends of the pick-up conveyor chains showing the driving mechanism therefor.

Fig. 8 is a sectional view on the line 8—8, Fig. 3.

Referring more in detail to the drawings:

1 designates a housing extending longitudinally in the direction of travel of the machine for enclosing a shelling and shredding cylinder 2 which reduces the harvested material and discharges it into the separating section of the machine (not shown), which may be of conventional construction and specifically forms no part of the present invention.

Extending laterally from the side of the housing 1 and supported in rigid relation thereto is a trough-shaped conveyor pan 3 including a curved bottom sheet 4 having its forward edge extending laterally from adjacent the front of the housing 1 and its rear edge terminating in an upwardly inclined back wall 5 forming a windbreak and a support for the grain stalks as they are engaged by a conveyor 6 for feed into the housing 1. The outer end of the pan is closed by an end wall 7 which cooperates with the side wall 8 of the housing 1 to support the conveyor.

The conveyor 6 includes a shaft 9 of sufficient length to extend the full length of the pan, and carries a flighting 10 arranged to move in close relation to the bottom of the pan for engaging and feeding the stalks toward the shelling cylinder as later described. The ends of the shaft are rotatably mounted in suitable bearings 11, and the end adjacent the wall 8 carries a sprocket 12 which is driven by a chain 13 operating over a sprocket 14 on the cylinder shaft, the cylinder shaft in turn being actuated by a chain 15 which is driven from a suitable prime mover (not shown).

Fixed to and extending along the front lower edge of the conveyor pan is a Z-shaped bar 16 having an upper horizontal flange 17 cooperating with an upper angle bar 18 to form a supporting rail for the cutting mechanism later described. The Z-bar 16 and angle bar 18 are secured together and to the lip of the pan by bolts 19 extending through the flange 17, through openings in the edge of the pan and through the horizontal flange 20 of the angle bar 18. The other leg 21 of the angle bar 18 extends vertically along the upper edge of the pan and forms an attaching means for anchoring spaced vertical plate members 22, 23 and 24, respectively, that are spaced apart to form throats 25 and 26 having their centers arranged according to the standard spacing of the rows in a field so that when the machine is moved along the rows of corn, the stalks will align with the central portions of the throats.

The center plate member 23 includes a substantially flat rectangular portion 27 extending upwardly from the angle bar 18 to a point approximately in spaced relation with the upper portion of the screw conveyor. Extending from each side of the plate and from the top edge are forwardly and outwardly directed wing portions 28, 29 and 30, the wings 28 and 29 being connected to the wing 30 by substantially triangular-shaped portions 31 and 32 having arcuate forward edges merging into the straight front edges of the wings to form a hollow-like housing opening forwardly of the machine. Extending about the forward edges of the wing portions is a substantially U-shaped flange 33 for reinforcing the free edges of the housing and for attaching a covering shield for the pick-up mechanism.

The plate members 22 and 24 include vertical plate portions having their edges adjacent the throats provided with wings 34 similar to the wings 28 and 29 and along their top edges with wings 35 connected to the wings 34 by triangular-shaped portions 36 similar to those on the center plate previously described. The forward edges of the outer plates are likewise reinforced by flanges 37 and 38 similar to the flange 33 except that they are L-shaped to provide laterally directed ends which are secured to the housing 1 and to the outer end wall of the conveyor pan, respectively.

Projecting forwardly from the vertical portions of the outer plates 22 and 24 are tubular-shaped brackets 39 and 40, respectively, and projecting from the front face of the center plate 29 are spaced tubular-shaped brackets 41 and 42 to form the main supports for the pick-up mechanism. The brackets 39 and 41 and 40 and 42 are spaced equal distances from the throats 25 and 26. The brackets are preferably formed of sheet metal and rolled into tubular form, and their seams are riveted, as at 43, while their outer ends are closed by heads 44. The inner ends of the tubes abut against the supporting plates and carry flange collars 45 which are riveted or bolted thereto by suitable fastening devices 46, as best illustrated in Fig. 3.

In order to reinforce and stiffen the plates against buckling under leverage strains incidental to the weight carried on bracket members, the front portions of the plates are reinforced by plates 47 having their lower ends attached to the outer face of the vertical leg of the angle 18. The upper ends of the plates are provided with semi-circular notches to engage the under periphery of the tubular brackets, and are secured to the flanges of the brackets and to the supporting plates by certain of the fastening devices 46. The forward ends of the brackets are braced from their respective plates by brace arms 48 having their rear ends fixed to the upper portions of the plates and their forward ends provided with arcuate-shaped flanges 49 which are welded or otherwise secured to the tubes about midway of their length, as shown in Fig. 4.

Fixed adjacent the rear ends of each of the tubular brackets and projecting toward the throats 25 and 26 are arms 50 having curved seat portions fixed to the upper peripheries of the tubular brackets, as best illustrated in Fig. 4.

The arms 50 are curved upwardly and laterally from the tubular brackets and cooperate with similar arms 51 arranged reversely thereto in that they are attached to the lower peripheries of the tubular brackets adjacent their forward ends for supporting the pick-up mechanism now to be described.

The respective sets of arms are provided with spaced laterally extending ears 52—53 and 54—55 for supporting channel-shaped rails or guides 56 forming the sides of the passageways 57 and 58 which guide the stalks to the throats 25 and 26.

Fixed to the rear face of each of the arms 50 is an angle-shaped clip 59 for supporting gear housings 60. The gear housings 60 comprise upper and lower bell-shaped castings 61 and 62 provided with mating peripheral flanges 63 and 64, respectively, through which bolts 65 are extended to secure the castings together and the housings in position on the angle clips 59, as best illustrated in Fig. 3.

Extending outwardly in the axis of the bell-shaped portions of the castings are bearing bosses 66 and 67 having axially aligned bores 68 to mount suitable roller bearings 69 for rotatably supporting vertically extending shafts 70. The ends of the shafts 70 extend through the housings a sufficient distance to mount upper and lower sprockets 71 and 72, respectively.

The upper sprockets 71 are preferably of larger diameter than the lower sprockets in order that the upper sprockets will have a greater peripheral speed than the lower sprockets for a purpose later described.

Rotatably mounted in each of the gear housings 60 and keyed to the shafts 70 are bevel gears 73 which are driven from bevel pinions 74 mounted in lateral extensions 75 of the upper bell-shaped castings 61, as illustrated in Fig. 7. The pinions 75 are keyed to shafts 76 rotatably mounted in bearing bosses 77 projecting from the extensions 76 at right angles to the bearing bosses 66 and 67 for the shafts 70.

The opposite ends of the respective shafts 76 extend over the tubular brackets 39, 40, 41 and 42, and are rotatably supported in bearings 79 carried by the tubular brackets at a point in alignment with the plane of the axis of the shafts 70. The two outer shafts 76 are provided with sprockets 80 and 81, while the two intermediate shafts are interconnected by a single sprocket 82, or they may be provided as a single shaft extending from one gear box to the other as this shaft does not cross either one of the passageways for the stalks.

In order to drive the sprockets 80, 81 and 82 to actuate the shafts 70, I provide a shaft 83 extending parallel with the front edge of the conveyor pan and having one end rotatably mounted in a gear housing 84 supported by the housing 1 adjacent the wall 8 thereof, as illustrated in Fig. 2, and its opposite end in a housing 85 supported from the outer tubular bracket 40, as illustrated in Fig. 8. The shaft 83 extends through a series of gear housings 86 which are carried from the Z-bar 16, as later described.

Fixed on the shaft 83 in alignment with the sprockets 80, 81 and 82 are sprockets 87, 88 and 89, and operating over the aligning pairs of sprockets are chains 90, 91 and 92, respectively.

The shaft 83 is driven from the conveyor screw shaft 9 by a chain 93 operating over a sprocket 94 on the conveyor shaft and over a sprocket 95 fixed to a stub shaft 96 that is rotatably mounted in the gear housing 84. Fixed on the stub shaft 96 is a spur gear 97 meshing with a gear 98 on the shaft 83 (see Fig. 2). It is necessary to the proper shelling of the grain that the cylinder 2 should rotate in the direction of the arrow, Fig. 2, and therefore the conveyor shaft rotates toward the front edge of the conveyor pan. It is also necessary that the sprockets for the pick-up chains rotate in the proper direction and it is for this reason that the gears 97 and 98 are provided to reverse the rotation of the shaft 83 in order that the pick-up chains will be driven in the required directions.

Supported by the upper flanges 99 of the guide 56 are plates 100 (Figs. 5 and 6) having openings 101 to mount upwardly extending stub shafts 102 which are located in alignment with the upper ends of the shafts 70 to mount idler sprockets 103 over which the upper pick-up chains operate as later described. Fixed to the vertical web of the guide members and extending in the direction of the flanges 99 are bracket arms 104 carrying plates 105 located in parallel relation with the plates 100 but at offset relation thereto.

The plates 105 are also secured to the lower flanges of the front supporting arms 51 by a rivet or the like 106 extending through the lower flange and through the plate as shown in Fig. 5. The front of the plate is braced by a bar 107 connected with an upwardly and laterally extending pivot member 108 for mounting pivoted pick-up shoes as later described. The plates 105 are also provided with openings 109 for mounting stub shafts 110 which extend downwardly therefrom to mount sprockets 111 in operating alignment with the sprockets 72 on the shafts 70.

The stub shafts 102 and 110 include bearing portions 112 for the sprockets and have reduced threaded shanks 113 to extend through the openings in their supporting plates and to form shoulders 114 which cooperate with nuts 115 on the shanks for engaging opposite faces of the plates to retain the shafts in proper position. The sprockets 103 and 111 are retained on the stub shafts by collars 116 which are secured to the shafts by pins 117.

Operating over each of the pairs of upper sprockets 71 and 103 are chains 118—119 and 120—121 arranged so that the adjacent runs of the chains 118 and 119 and the adjacent runs of the chains 120 and 121 operate along the upper face of the respective guide members 56, and the runs thereof are backed by rails 122 secured between the upper flange 99 of the guides 56 and angle-shaped bars 123 which cooperate with the flanges 99 to form channel-shaped guides to retain the runs of the chain in functional position as the cornstalks are moved thereby toward the conveyor, as later described.

The lower pairs of sprockets are provided with similar chains 124—125 and 126—127, and the runs thereof in line with the members 56 are guided by rails 128 bolted between the lower faces of the guides 56 and the lower flanges 129 of the guides 56 and plates 130 which cooperate with the flanges to form guide tracks similar to those for the upper chains, as previously described. The opposite runs of the upper chains are guided by bars 131 which are adjustably carried from the pairs of arms 50 and 51 on plates 132 and 133. The plates 132 and 133 are provided with longitudinal slots 134 in order that the guide rails may be moved to and from the sprockets for tensioning the chains. The guide rails are clamped in position on the plates by bolts 135 which extend through openings in the rails and the slots in the plates, and are secured by clamping nuts 136, as illustrated in Fig. 8. The inner runs of the lower chains are similarly guided by rails 137 also supported by the arms.

The upper pairs of chains are longer than the lower pair in order that when the cutting unit is moved into close proximity with the ground the forward ends of both sets of chains operate to engage the cornstalks as close to the ground as possible. In order to engage the stalks and guide them toward the throats 25 and 26, the chains are provided with laterally extending lugs 138 of sufficient length so that the lugs on the chains extend substantially half-way across the space between the guides 54.

In order to cut the stalks delivered by the chains, I provide pairs of circular blades 140—141 and 142—143 mounted in the respective guideways, as now to be described. The blades of each pair are supported by the gear housings 86 so that they rotate toward each other in slightly overlapped relation, as best illustrated in Fig. 2. The circular blades are fixed to the upper ends of shafts 144 which are rotatably mounted in the gear housings and carry spiral gears 145 meshing with spiral gears 146 on the shaft 83 (see Fig. 3). The upper sides of the blades are covered by dome-shaped shields 147, while the lower sides are protected by similar shields 148 formed on the gear housings. The teeth on the respective spiral gears are arranged so that the pairs of blades 140—141 and 142—143 rotate toward each other, and the diameters of the gears may be such that one of the blades rotates at a slightly faster speed than the other to aid in the cutting of the stalks and the discharge of the stalks into the conveyor pan.

The pick-up conveyor mechanism, including the sets of chains 119—125 and 120—126, are covered by a shield 149 having its rear edge secured to the flange 33 and its forward edge attached to a yoke-shaped member 150 extending across the outer ends of the center pair of tubular bracket members, as best illustrated in Fig. 1, while the pick-up mechanisms, including the outer sets of chains, are enclosed by similar shields 151 and 152 similarly supported from the flanges 37 and 38 and yokes 153 and 154, respectively carried at the ends of the outer tubular brackets 39 and 40.

Pivotally supported on the brackets or pivot members 108 are forwardly extending shoes 155, 156 and 157. The base portions of the shoes conform in shape to the ends of the shields just described and taper forwardly to provide pointed ends 158 carrying reinforced ends 159. The lower corners of the shoes are fixed to the brackets by bolts 160 that extend through the members 108 (Fig. 3), and their upper portions are supported by bars 161 having their rear ends pivotally attached to bolts 162 carried by the yokes supported on the front ends of the tubular brackets. The forward ends of the bars are provided with a plurality of openings 163 and slidably extend through ears 164 depending from the inner face of the shoes. The shoes are retained in adjusted position relatively to the ground by pins 165 extending through one of the openings and engaging the outer face of the ears, as illustrated in Fig. 1.

It is thus apparent that by selecting the opening through which the pin is inserted the shoes may be supported at varying distances from the ground. If the pins are removed, the shoes will slide directly on the ground as the machine is being moved across the field. It is desirable that the shoes move as close to the ground as possible in order that the fallen stalks may be picked up and guided thereby to be engaged by one or other of the pick-up chains which then engage the stalks and move them into engagement with the circular cutters.

The outer members 108 are supported directly by the outer tubular brackets upon outwardly and downwardly extending arms 167 braced by bars 168 and 169 connecting the lower end of the arms 167 with the front and rear ends, respectively, of the outer tubular members.

In using a harvester constructed and assembled as described, the machine is drawn over the field and along the rows of corn so that one row enters the passageway 57 while an adjacent row enters the passageway 58. Operation of the pick-up chains causes the fingers 138 to engage the stalks of corn to feed them toward the circular cutting devices 142 and 143, aided by the forward travel of the machine.

In order to straighten the fallen stalks, the upper chain runs at a slightly higher speed than the lower chain so that the upper portions of the stalks are moved at a faster speed, which tends to move the stalks into perpendicular position. When the stalks are engaged by the saws, they are severed and discharged by centrifugal force into the conveyor pan with the tops falling against the back board 5. The screw conveyor then engages the cut ends of the stalks and feeds them toward the threshing cylinder where the ears are shelled and the fodder is shredded for discharge into the separating portion of the machine.

What I claim and desire to secure by Letters Patent is:

1. In a harvesting machine, a cutting unit including pairs of vertically spaced movable pick-up members, and means for actuating the upper pick-up members at a faster speed than the lower pick-up members whereby inclining stalks engaged by said pick-up members are moved to a vertical position.

2. In a harvesting machine of the character described, a cutting unit including a conveyor pan, a bracket member supported in front of the pan and extending forwardly of the machine, arms carried by the bracket member, vertically spaced pick-up members carried by the said arms for moving stalks toward the conveyor pan, means for actuating the upper pick up member at a faster speed than the lower pick up member whereby inclining stalks engaged by said pick up members are moved to vertical position, and means supported in front of the conveyor pan for severing the straightened stalks moved by said pick-up members.

3. In a harvesting machine of the character described, a cutting unit including a conveyor pan, a plate member supported in front of the pan, a bracket member having its end secured to the plate member and projecting forwardly of the machine, vertically spaced pick-up members carried by the bracket member for moving stalks toward the conveyor pan, means for actuating the upper pick up member at a faster speed than the lower pick up member, whereby inclining stalks are moved to vertical position and means supported in front of the conveyor pan for severing the stalks moved by said pick-up members.

4. In a harvesting machine of the character described, a cutting unit comprising a conveyor pan, spaced plate members supported in front of the pan, tubular bracket members having their ends secured to the plate members and extending forwardly of the machine, arm members extending laterally from the bracket members, pairs of vertically spaced pick-up chains carried by the arm members for moving stalks toward the conveyor pan, and means supported in front of the conveyor pan for severing the stalks moved by said pick-up chains.

5. In a harvesting machine of the character described, a cutting unit comprising a conveyor pan, spaced plate members supported in front of the pan, tubular bracket members having their ends secured to the plate members and extending forwardly of the machine, arm members extending laterally from the bracket members, pairs of vertically spaced pick-up chains carried by the arm members for moving stalks toward the conveyor pan, means supported in front of the conveyor pan for severing the stalks moved by said pick-up chains, and means for operating the upper pick-up chains at a higher speed than the lower chains whereby the stalks are moved to a perpendicular position when engaged by the conveyor chains.

6. In a harvesting machine of the character described, a cutting unit comprising a conveyor pan, spaced plate members supported in front of the pan, tubular bracket members having their ends secured to the plate members and extending forwardly of the machine, vertically spaced pick-up members carried by the tubular bracket members for moving stalks toward the conveyor pan, guide shoes pivotally supported in front of the pick-up members, and means supported in front of the conveyor pan for severing the stalks moved by said pick-up members.

7. In a harvesting machine, a cutting unit including supporting members, pairs of vertically spaced conveyor chains spaced apart to form a passageway between the pairs of chains, fingers on the chains movable through said passageway, and means for operating the upper chains at a faster speed than the lower chains whereby inclining stalks engaged by said fingers are moved to a vertical position.

8. In a harvesting machine of the character described, a cutting unit comprising a conveyor pan, spaced plate members supported in front of the pan, tubular bracket members having their ends secured to the plate members and extending forwardly of the machine, means for bracing the tubular bracket members from the plate members, arm members extending laterally from the bracket members, pairs of vertically spaced pick-up chains carried by the arm members for moving stalks toward the conveyor pan, means supported in front of the conveyor pan for severing the stalks moved by said pick-up chains, and means for operating the upper pick-up chains at a higher speed than the lower chains whereby the stalks are moved to a perpendicular position when engaged by the conveyor chains.

9. In a harvesting machine of the character described, a cutting unit comprising a conveyor pan, spaced plate members supported in front of the pan, tubular bracket members having their ends secured to the plate members and extending forwardly of the machine, arm members extending laterally from the bracket members, guide members carried by said arm members and spaced apart to form a guideway therebetween, pairs of vertically spaced pick-up chains supported by the tubular bracket members and movable in said chain guides for moving stalks toward the conveyor pan, means supported in front of the conveyor pan for severing the stalks moved by said pick-up chains, and means for operating the upper pick-up chains at a higher speed than the lower chains whereby the stalks are moved to a perpendicular position when engaged by the conveyor chains.

10. In a harvesting machine of the character described, a cutting unit comprising a conveyor pan, spaced plate members supported in front of the pan, tubular bracket members having their ends secured to the plate members and extending forwardly of the machine, arm members extending laterally from the bracket members, guide members carried by said arm members and spaced apart to form a guideway therebetween, pairs of vertically spaced pick-up chains supported by the tubular bracket members and movable in said chain guides for moving stalks toward the conveyor pan, and means supported in front of the conveyor pan for severing the stalks moved by said pick-up chains.

11. In a harvesting machine of the character described, a cutting unit comprising a conveyor pan, spaced plate members supported in front of the pan, tubular bracket members having collars on their ends secured to the plate members, reinforcing plate members fixed to the pan and to said collars, vertically spaced pick-up members carried by the tubular bracket members for moving stalks toward the conveyor pan, guide shoes pivotally supported in front of the pick-up members, and means supported in front of the conveyor pan for severing the stalks moved by said pick-up members.

12. In a harvesting machine, a cutting unit including supporting members, pairs of vertically spaced conveyor chains spaced apart to form a passageway between the pairs of chains, fingers on the chains and movable through said passageway, means for operating the upper chains at a faster speed than the lower chains whereby inclining stalks engaged by said fingers are moved to a vertical position, and pivoted guide shoes supported in front of said conveyor chains to guide the stalks into position to be engaged by the conveyor chains.

13. In a harvesting machine of the character described, a cutting unit comprising a conveyor pan, spaced plate members supported in front of the pan, tubular bracket members having collars at their ends secured to the plate members, means for bracing the tubular bracket members from the plate members, laterally extending arms fixed to the tubular bracket members, guide members fixed to the arms, sprockets supported adjacent the ends of the guide members, vertically spaced pick-up chains operable over the sprockets for moving stalks toward the conveyor pan, guide shoes pivotally supported in front of the pick-up members, and means supported in front of the conveyor pan for severing the stalks moved by said pick-up members.

14. In a harvesting machine of the character described, a cutting unit comprising a conveyor pan, spaced plate members supported in front of the pan, tubular bracket members having collars at their ends secured to the plate members, means for bracing the tubular bracket members from the plate members, laterally extending arms fixed to the tubular bracket members, guide members fixed to the arms, sprockets supported adjacent the ends of the guide members, and vertically spaced pick-up chains operable over the sprockets for moving stalks toward the conveyor pan.

15. In a harvesting machine of the character described, a cutting unit comprising a conveyor pan, spaced plate members supported in front of the pan, bracket members having their ends secured to the plate members and extending forwardly of the machine, arm members extending laterally from the bracket members, pairs of vertically spaced pick-up chains carried by the arm members for moving stalks toward the conveyor pan, and means supported in front of the conveyor pan for severing the stalks moved by said pick-up chains.

16. In a harvesting machine of the character described, a cutting unit comprising a conveyor pan, spaced plate members supported in front of the pan, wings on adjacent sides of the plate members and spaced apart to form a throat therebetween, bracket members having their ends secured to the plate members and extending forwardly of the machine, laterally extending arms on the bracket members, guide members fixed to the arms and spaced apart to form a passageway leading to said throat, pick-up members operable along said guide members for moving stalks toward the conveyor pan, and means supported in front of the conveyor pan for severing the stalks moved by said pick-up members.

17. In a harvesting unit, supporting means for stalk pick up members including a mounting plate, wings on the mounting plate, tubular bracket members having their ends secured to the mounting plate and having their opposite ends extending forwardly therefrom, a yoke member supported by the forward ends of the tubular bracket member, brace members fixed to the mounting plate and to the forward ends of the tubular members, arms fixed to the tubular bracket member, pick up guide members carried by said arms, and a covering member having its ends fixed to the mounting plate and to the yoke member respectively and having its side edges fixed to said guide members for cooperating with the brace members to enhance the rigidity of the bracket member.

18. In a harvesting machine, a cutting unit including upper and lower pick up members, and means for actuating the upper pick up member at a faster speed than the lower pick up member whereby inclining stalks engaged by said pick up members are moved to vertical position.

19. In a harvesting unit, supporting means for stalk pick up members including a mounting plate, wings on the mounting plate, tubular bracket members having their ends secured to the mounting plate and having their opposite ends extending forwardly therefrom, bar members, a yoke member supported by the forward ends of the tubular bracket members and having ends cooperating with said wings for supporting the bar members, brace members fixed to the mounting plate and to the forward ends of the tubular members, laterally extending arms fixed to the tubular bracket members, pick up guide members fixed to the arms, a shield member having side edges fixed to said bar members and end edges and to the mounting plate and to the yoke member, and a guide shoe cooperating with the shield member for enclosing the bracket and arm members.

20. In a harvesting unit, supporting means for stalk pick up members including a mounting plate, a tubular bracket member having a collar at the end thereof secured to the mounting plate, means for bracing the tubular bracket member from the mounting plate, laterally extending arms fixed to opposite ends of the tubular bracket member, and pick up guide members carried by said arms.

21. In a harvesting machine of the character described, a cutting unit comprising a conveyor pan, spaced mounting plates supported in front of the pan, tubular bracket members having collars on their ends secured to the mounting plates, reinforcing plate members fixed to the pan and overlying said collars, laterally extending arms supported on the tubular bracket members, guide members fixed to the arms, pick up members supported by said arms and operable along the guide members for moving stalks toward the conveyor pan, and means supported in front of the conveyor pan for severing the stalks moved by said pick up members.

TORVALD N. PIERSON.